Dec. 16, 1924.

A. M. DEMUTH

COOKING APPARATUS

Filed Nov. 22, 1922

Inventor:
Alfred M. Demuth
By J. F. Jochum Jr.
Atty.

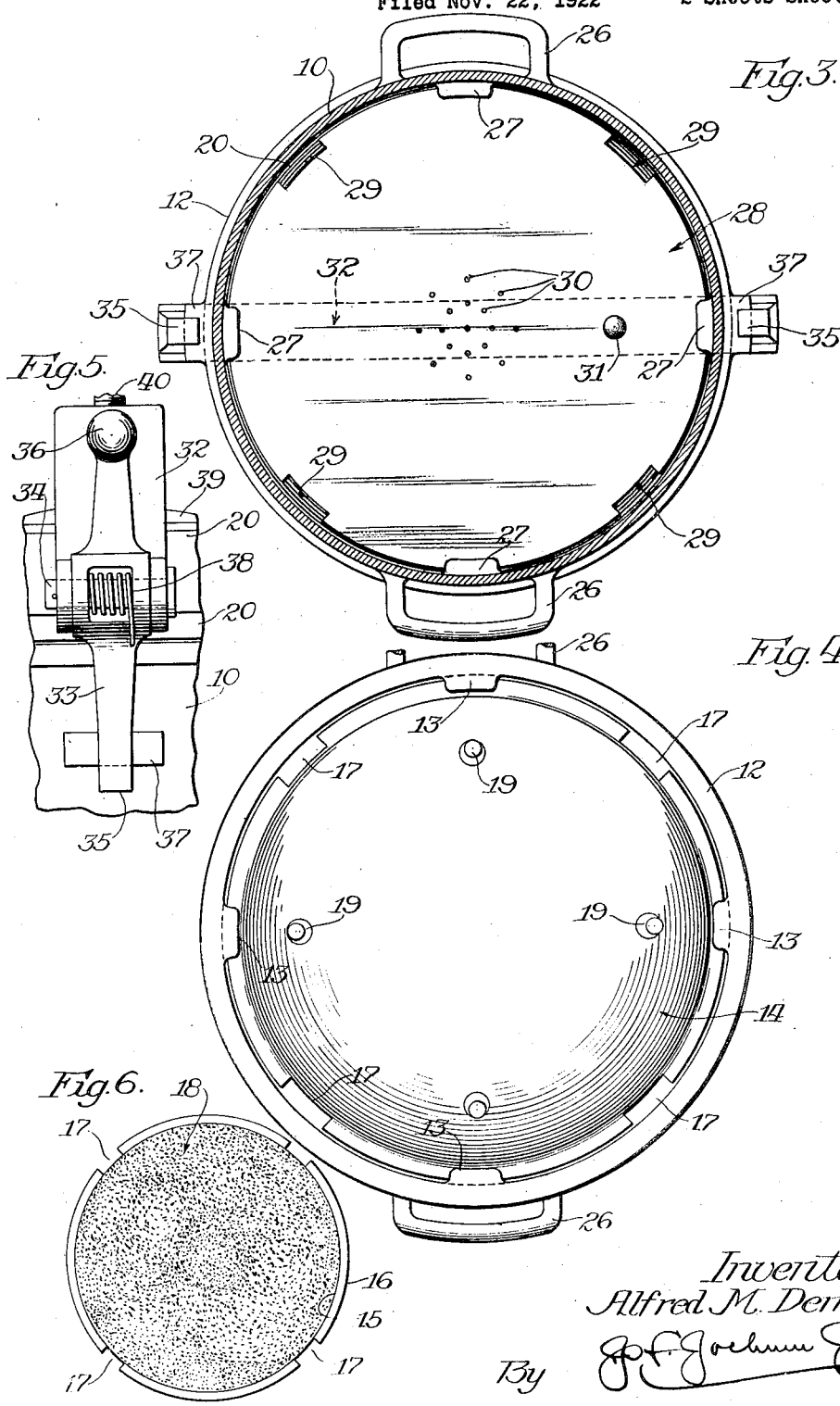

Patented Dec. 16, 1924.

1,519,766

UNITED STATES PATENT OFFICE.

ALFRED M. DEMUTH, OF CHICAGO, ILLINOIS.

COOKING APPARATUS.

Application filed November 22, 1922. Serial No. 602,565.

*To all whom it may concern:*

Be it known that I, ALFRED M. DEMUTH, a citizen of the United States, residing at Chicago, in the county of Cook and State of Illinois, have invented certain new and useful Improvements in Cooking Apparatus, of which the following is a specification.

This invention relates to improvements in cooking apparatus and more specifically to the type known as pressure cookers, in which articles of food are hermetically sealed and are cooked by the pressure of the steam or vapor formed in the receptacle.

Heretofore considerable difficulty and inconvenience has been experienced with cookers of this character in that the flame for heating the cooking vessel impinges the bottom of the vessel with the result that the articles of food resting upon the bottom often stick to the bottom and become burned. Furthermore considerable difficulty is also experienced by reason of the fact that the juices and liquids in the receptacle are often conveyed into the valves and pressure gauge with the result that they become clogged and oftentimes inoperative. Furthermore with pressure cookers of this character and as now constructed the lid or cover for the receptacle is secured or fastened by means of a plurality of screws and thumb nuts, necessitating the adjustment of a number of thumb nuts before the cover can be removed. After the receptacle has been in use for any length of time these nuts become heated to the extent that they stick and are difficult to remove.

To overcome all of these difficulties and objections and to provide an improved cooker of this character which will be simple, durable and cheap in construction, and effective and efficient in operation, is one of the objects of the present invention.

A further object is to provide improved means for protecting the articles of food and prevent them from becoming burned and from sticking to the bottom of the vessel at points where the flame contacts with the bottom of the vessel.

A further object is to provide improved means for preventing the liquid within the vessel from entering the valves and gauge during the cooking operation.

A further object is to provide improved means for securing the lid or closure in position.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which—

Figure 3 is a detail sectional view taken on line 3—3, Figure 1.

Figure 4 is a bottom plan view of Figure 1.

Figure 5 is an enlarged elevation of one of the fastening catches for the closure.

Figure 6 is a plan view of a detail.

Figure 1:
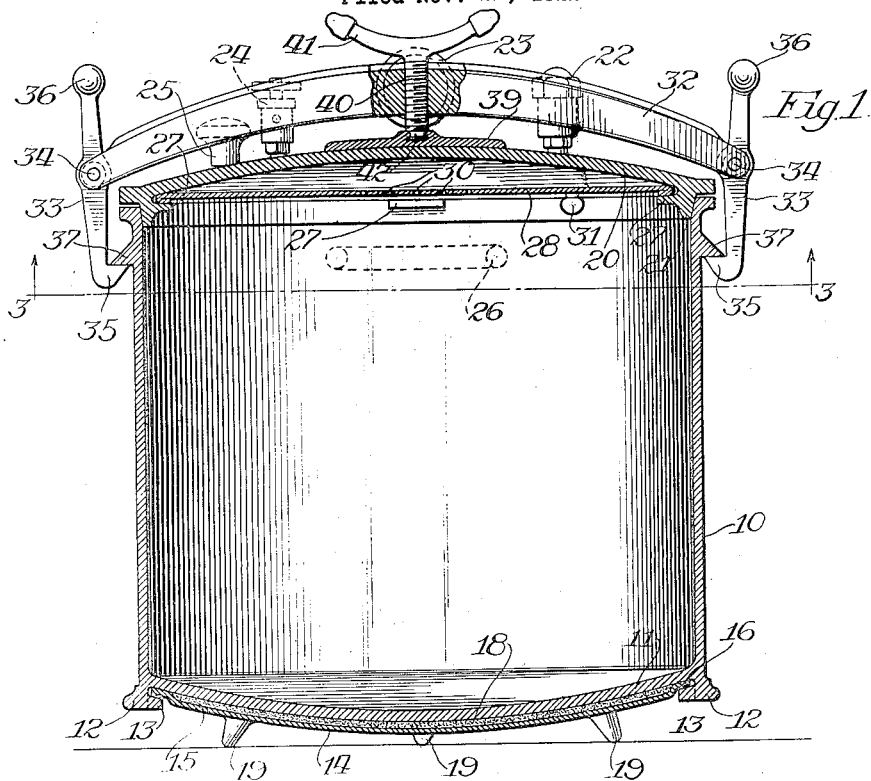
Figure 1 is a view partly in vertical section, partly in elevation and partly broken away of a cooker of this character constructed in accordance with the principles of this invention.
Figure 2:
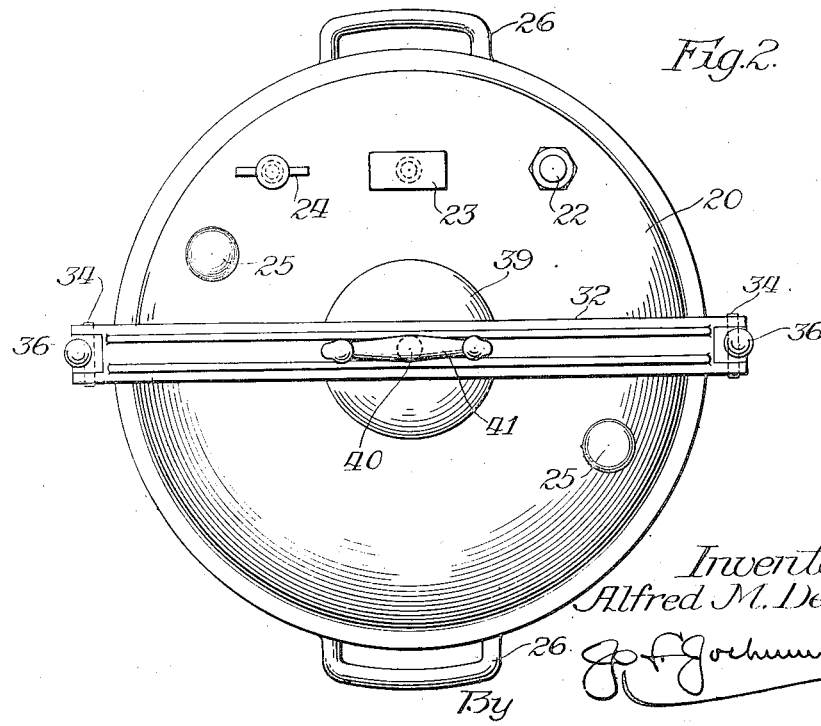
Figure 2 is a top plan view of Figure 1.

Referring more particularly to the drawing the numeral 10 designates generally a vessel or container which may be constructed of any suitable material and of any desired size and configuration, the bottom 11 of which is preferably of a thickness slightly greater than the sides of the vessel.

Projecting below the bottom 11 is a flange 12, which if desired may be a continuation of the wall 10 and this flange 12 is provided with a plurality of inwardly extending laterally projecting lugs 13, spaced about the circumference of the flange. Any number of these lugs 13 may be provided and are disposed in close proximity to the outer face of the bottom 11.

A supplemental bottom 14 is provided for the vessel. This bottom 14 may be constructed of any suitable material and is of a configuration to conform to the contour of the outer face of the bottom 11. The supplemental bottom 14 is provided with a recess 15, opening through its upper face and which recess terminates considerably short of the periphery of the bottom 14 to form a circumferential portion 16 having a series of recesses or notches 17 opening through the periphery.

Seated within the recess 15 is a member 18 which is constructed of any suitable fireproof material such as asbestos or the like, which fits snugly within the recess so that the upper face thereof stands substantially flush with the upper face of the flange 16.

If desired lugs or projections 19 may extend beyond the lower face of the supplemental bottom 14. The supplemental bottom 14 is secured in position so that the material 18 will contact with the outer face of the bottom 11 and the recesses or notches 17 will be in position to receive or permit the lugs 13 to pass therethrough, after which the supplemental bottom 14 may be shifted or rotated with respect to the bottom 11 to cause the notches or recesses 17 to pass out of alinement with the lugs 13, with the result that the flange 16 will be wedged between the lugs 13 and the bottom 11 for securing the supplemental bottom 14 in position.

The projections 19 serve as a means whereby the bottom 14 may be shifted with respect to the bottom 11 for securing the bottom 14 in position or for removing the same, and they also serve as a means for supporting the vessel when the bottom 14 is in position.

With this improved construction it will be manifest that when the vessel is placed over a flame the flame will impinge the bottom 14 but the material 18 between the bottom 14 and the bottom 11 causes the heat to be dissipated uniformly throughout the bottom 11 and will prevent the articles from sticking to the bottom.

A closure 20 is provided for the vessel and which closure may be provided with a depending flange 21 adapted to engage the inner surface of the wall 10. The cover is preferably arched as shown and there may be supported upon the cover a fitting such as a safety blow off device 22, a fitting such as a pressure gauge 23, and a fitting such as a relief valve 24, all of which have communication with the interior of the vessel 10.

The closure may also be provided with handles 25 for transporting the same and handles 26 may be secured to the vessel 10.

The cover 20 is preferably provided with a plurality of lugs 27 projecting laterally from the lower face thereof for supporting a member 28, which latter may be constructed of any suitable material and is provided with recesses 29 opening through the periphery thereof, while the body portion preferably adjacent its diametric center is provided with a plurality of openings or apertures 30.

The element 28 may be secured to the cover 20 by placing the notches or recesses 29 adjacent the respective lugs 27 to permit the latter to pass through the recesses or notches, after which the element 28 may be rotated with respect to the cover or closure 20 so that the recesses or notches 29 will pass out of alinement with the lugs 27.

The element 28 may be rotated in any suitable manner such as by means of a handle 31 connected therewith.

The element 28 is provided in order to prevent the liquid in the vessel 10 from splashing or entering into the passageways leading to the fittings connected with the closure, as the liquid if it is agitated to a sufficient extent, will be arrested by the element 28 while the steam or vapor arising from the liquid will pass through the apertures 30 in the element 28 and thence to the fittings carried by the closure, such as the valves and gauge. This is accomplished by reason of the fact that the element 28 is so arranged that it co-operates with the closure 20 to form a comparatively small space therebetween and adjacent the entrance passage to the fittings in the closure.

The closure 20 may be secured in position upon the vessel in any desired or suitable manner but preferably by means of a clamping bar 32, which may be constructed of any suitable material and of any desired size and configuration, but is preferably of a length slightly greater than the diameter of the closure and carried by each end of the bar 32 is a member 33 pivoted to the bar intermediate its ends as at 34. One end of the member 33 is of a hook shape formation as at 35, and the other end is shaped to form a handle 36.

Connected with the periphery of the wall 10 of the vessel are lugs 37, one of which is provided to be engaged by the hook shaped extremity 35 of each of the members 33. If desired a spring 38 may be provided which tends normally to move the hook shaped extremity 35 of the members 33 in a direction to engage under the projections 37, the stress of the spring, however, being adapted to be overcome by the operation of the handles 36, to disengage the hooks 35 from the lugs or projections 37.

A plate or member 39 of an extended area, is adapted to engage and rest upon the closure 20 at its diametric center and engaging the plate 39 is a screw 40, which is threaded through the bar 32, and which screw is provided with an operating handle 41 in a convenient position for the operator.

The screw 40 has a swivel connection 42 with the plate 39 and which connection may be of any desired construction which will permit the member 40 to be screwed through the bar 32 until the plate 39 engages the closure 20 and a further rotation of the member 40 will force the plate 39 against the closure 20, the member 40 rotating with respect to the plate 39 during the latter part of the operation of the member 40.

With this improved construction it will be manifest that pressure being exerted at the diametric center of the closure 20 and over an extended area, will cause the closure to hermetically seal the vessel 10 and will also cause a uniform pressure to be exerted throughout the periphery of the closure. This is advantageous because heretofore with cookers of this type the closure has been secured by means of a plurality of fastening devices operating independently of each other, resulting oftentimes in an uneven pressure of the fastening means on the closure at different points throughout its circumference, rendering it possible for the pressure of the steam in the cooker to pry open the cooker. By exerting the securing pressure upon the closure at its diametric center the closure will be held with equal pressure at all points through its circumference.

Obviously the element 28 may be detached from the cover 20 by rotating the element until the recesses 29 are in alinement with the lugs 27, and likewise the supplemental bottom 14 may be removed from the vessel by rotating the supplemental bottom 14 through the medium of the lugs 19, until the notches or recesses 17 are in alinement with the lugs 12.

The term "fitting" as employed in the specification and claim is not to be construed as a term of limitation but is intended to cover any kind of a fitting which is connected with the cover and which has communication with the interior of the vessel, such as a safety blow off device, a gauge, a pet cock, etc.

While the preferred form of the invention has been herein shown and described, it is to be understood that various changes may be made in the details of construction and in the combination and arrangement of the several parts, within the scope of the claim, without departing from the spirit of this invention.

What is claimed as new is:—

A cooking vessel, a closure therefor, valve mechanism connected with the closure and having communication with the interior of the vessel, said closure having a downwardly projecting flange spaced from the periphery of the closure, laterally projecting lugs extending inwardly from the flange and spaced above the lower edge of the flange, and a shield extending across the closure and having recesses opening through the periphery thereof to receive the said lugs whereby the shield may be placed in position and then rotated to cause the periphery of the shield to pass above the said lugs to be held in position by the said lugs against the adjacent overhanging portion of the said closure, there being apertures through the shield and spaced from the periphery thereof.

In testimony whereof I have signed my name to this specification, on this 18th day of November, A. D. 1922.

ALFRED M. DEMUTH.